Dec. 6, 1949        B. B. HAZARD        2,490,520
RECIPROCATING AGITATOR FOR SCREENS
Filed Aug. 13, 1945
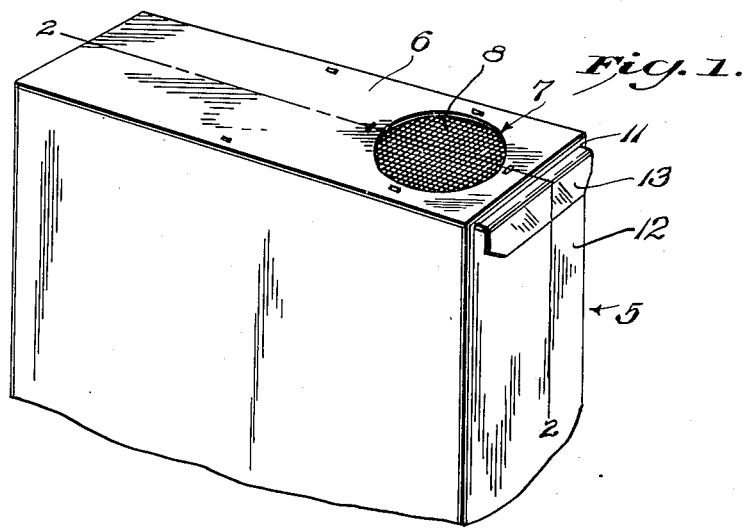
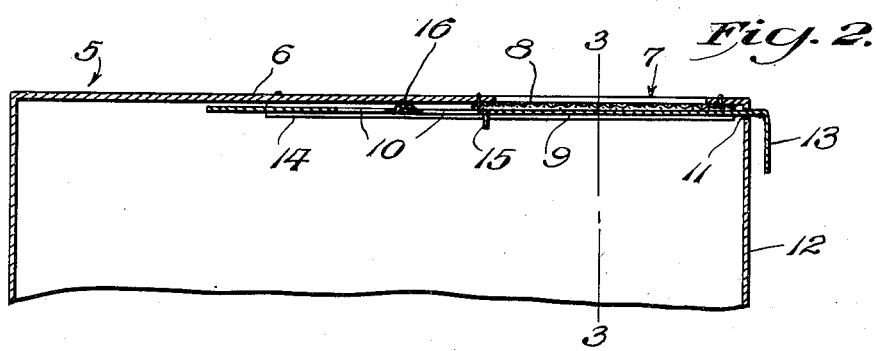
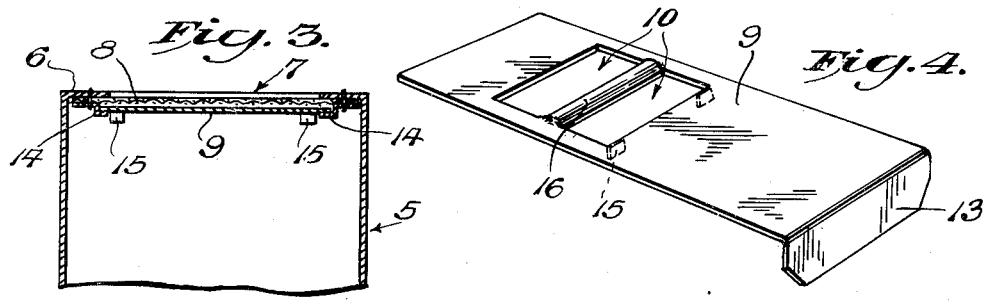
Inventor
Barbara B. Hazard
By W. A. McDowell
Attorney Patented Dec. 6, 1949

2,490,520

UNITED STATES PATENT OFFICE 2,490,520

RECIPROCATING AGITATOR FOR SCREENS

Barbara B. Hazard, Wilmington, Ohio

Application August 13, 1945, Serial No. 610,527

4 Claims. (Cl. 209—357)

This invention relates to sifter means for use in association with flour boxes and other finely divided materials, and has for one of its objects to provide simple, inexpensive and efficient means for sifting and aerating finely divided materials as the same are undergoing discharge from cartons or boxes in which the same customarily are commercially packed.

Many grades of cereal flour, particularly the finely milled grades used in cake baking or the like, require sifting or aeration in producing baked products of desirable texture or lightness. As a practical matter, such sifting is often neglected or improperly carried out and the cause of the imperfectly baked products resulting therefrom wrongfully attributed to the baking flour used.

It is, therefore, an important object of the present invention to provide a box for finely mixed baking flours by which proper aeration and sifting of the flour is necessarily obtained as the contents of the box are being discharged.

It is a further object of the invention to provide a box for baking flours in which a screened outlet is provided, the outlet having associated therewith a reciprocable closure and scraper element operable from the exterior of the box, and which element is movable over the under surface of the outlet screen to open or close the outlet and, when reciprocated, to clean the screen of obstructing deposits, insuring a positive and regulated flow of the flour through the outlet in a manner providing for effective aeration thereof.

In connection with the aforesaid objects, I have developed certain novel mechanical features of construction which are set forth more fully hereinafter and illustrated in the accompanying drawing, wherein:

Fig. 1 is a perspective view of the upper portion of a flour box provided with improved sifting and aerating means constituting the present invention;

Fig. 2 is a vertical sectional view taken through the box on the plane indicated by the line 2—2 of Fig. 1;

Fig. 3 is a vertical transverse sectional view on the line 3—3 of Fig. 2;

Fig. 4 is a detail perspective view of the reciprocable closure and scraper element.

Referring more particularly to the drawings, the numeral 5 designates a standard form of paperboard box or carton in which baking flours, or other finely divided materials, may be commercially packed. In accordance with the present invention, the top 6 of the box is formed with an outlet opening 7 and across this opening there is arranged a fine mesh screen 8, preferably of wire. Located immediately beneath the top of the box is a slidable closure plate 9. This plate, as shown in Fig. 4, is formed in its length with one or more openings 10 which, through sliding adjustment of the plate, may be registered with the outlet opening 7 and its screen 8 to provide for the discharge of the box contents.

Ordinarily, the plate projects at one end through a slide 11 provided in the upper region of one of the side walls 12 of the box, and terminates in an exteriorly positioned downwardly directed flange 13. Normally, this flange lies closely adjacent to the outer surface of the side wall 12 but may be engaged by the fingers of the user of the box so that the plate may be reciprocated to positions registering the openings 10 therein with the box outlet 7, or to close said outlet, as desired.

In addition to the guidance provided by the slit 11 in the wall 12, the side edges of the plate 9 may be received in stationary guide bars 14 carried by and depending from the under surface of the box top 6, so that the closure plate may be effectively supported in its various positions of use. Preferably, the plate 9 is formed with downwardly turned lips 15 which limit outward sliding movement of the plate, so that the same cannot be accidentally withdrawn from the box.

Another important feature of the invention resides in forming the plate with a transverse scraper element 16 which, advantageously, may be arranged between the openings 10 therein. The scraper element is raised somewhat above the general horizontal plane of the body of the plate 9, so that when the latter is moved to a position registering the openings 10 therein with the outlet 7, the scraper element will frictionally engage with the under surface of the screen 8. When so positioned, the plate is reciprocated, causing the scraper element to move back and forth across the screen, and with the box in an inverted position, such action on the part of the plate will produce positive and regulable flow of the flour through the box outlet. The scraper element prevents the flour from obstructing the passages of the screen, and agitates or vibrates the latter sufficiently so that the flour passes therethrough in volumes and in a manner providing for desired aeration thereof as it is being discharged from the box.

Thus, with the use of the present invention, the desired sifting or aeration of the flour is necessarily obtained during discharge of the flour from the box, and the manufacturer or packer of the flour is thereby assured that his product will be properly dispensed for its most efficient utilization in baked or other food products. It will be understood that any suitable materials may be used in the manufacture of my improved sifter construction and that various changes in the arrangement and proportion of the structural elements above described and illustrated may be made without departing from the essential features of the invention or the scope of the following claims.

I claim:

1. Sifter construction comprising a box formed for the reception of finely divided materials, said box being provided with a material-discharging opening, a stationary fine mesh screen disposed across said opening, a slidable closure plate carried by said box adjacent to and below said screen and outlet opening, said plate having an actuating extension disposed exteriorly of said box, the body of said plate being provided with an opening adapted for registration with said outlet opening when the contents of the box are to be discharged, a transverse scraping element formed with said plate adjacent to the opening therein, said element being engageable with said screen for producing forced passage of the finely divided materials contained in said box through said screen, and guide means formed with said box for the slidable reception of said plate.

2. Sifter construction comprising a box formed for the reception of finely divided materials, said box being provided with a material-discharging opening, a stationary fine mesh screen disposed across said opening, a slidable closure plate carried by said box adjacent to said screen and immediately below outlet opening, said plate having an actuating extension disposed exteriorly of said box, the body of said plate being provided with an opening adapted for registration with said outlet opening when the contents of the box are to be discharged, a raised transverse scraping element formed with said plate adjacent to the opening therein, said element being engageable with said screen for producing forced passage of the finely divided materials contained in said box through said screen, guide means formed with said box for the slidable reception of said plate, and means for limiting the extent of sliding movement of said plate.

3. In a paperboard box or carton for the reception of baking flours and other finely divided materials, a top for said box formed at one end thereof with an opening for the discharge of the contents of the box, a stationary sieving screen secured to said top and covering said opening, a slidable substantially rectangular closure plate for said opening supported in connection with said top immediately below the opening therein, one end of said plate projecting through a slit provided in one end of said box at the top thereof, the end of said plate projecting through said slit being formed with an actuating extremity accessible exteriorly of said box, the body of said plate being of sufficient length to provide an imperforate region for covering said screen and opening when the plate occupies a position of closure within the confines of the box and to present an opening adapted to register with the opening in the box top when said plate is moved outwardly, and a scraper device formed with said plate contiguous to the opening therein, said device being movable into direct contact with the screen when said plate occupies its box-like opening position.

4. In a paperboard box or carton for the reception of baking flours and other finely divided materials, a top for said box formed at one end thereof with an opening for the discharge of the contents of the box, a stationary sieving screen secured to said top and covering said opening, a slidable substantially rectangular closure plate for said opening supported in connection with said top immediately below the opening therein, one end of said plate projecting through a slit provided in one end of said box at the top thereof, the end of said plate projecting through said slit being formed with an actuating extremity accessible exteriorly of said box, the body of said plate being of sufficient length to provide an imperforate region for covering said screen and opening when the plate occupies a position of closure within the confines of the box and to present an opening adapted to register with the opening in the box top when said plate is moved outwardly, a scraper device formed with said plate contiguous to the opening therein, said device being movable into direct contact with the screen when said plate occupies its box-like opening position, guide devices carried by said box for the slidable support of said closure plate, and stop means for limiting the extent of sliding movement of said plate.

BARBARA B. HAZARD.

REFERENCES CITED

The following references are of record in the file of this patent:

UNITED STATES PATENTS

| Number | Name | Date |
|---|---|---|
| 226,804 | Taylor | Apr. 20, 1880 |
| 382,541 | Martin | May 8, 1888 |
| 508,345 | Sackett | Nov. 7, 1893 |
| 667,550 | Moller | Feb. 5, 1901 |
| 1,153,378 | Frankenberg | Sept. 14, 1915 |
| 1,485,032 | Janes | Feb. 26, 1924 |
| 1,754,482 | Nicholls | Apr. 15, 1930 |
| 2,224,495 | Wiggins | Dec. 10, 1940 |